United States Patent [19]

Nemoto

[11] Patent Number: 4,555,140
[45] Date of Patent: Nov. 26, 1985

[54] VEHICLE SEAT
[75] Inventor: Akira Nemoto, Akishima, Japan
[73] Assignee: Japan, Japan
[21] Appl. No.: 583,033
[22] Filed: Feb. 23, 1984
[51] Int. Cl.[4] ............................................. A47C 7/02
[52] U.S. Cl. .................................... 297/452; 297/284; 297/DIG. 2; 297/DIG. 3; 297/DIG. 8
[58] Field of Search .......... 297/284, DIG. 3, DIG. 8, 297/455, DIG. 2, 452; 5/446, 455, 456

[56] References Cited

U.S. PATENT DOCUMENTS

| | | | |
|---|---|---|---|
| 3,171,691 | 3/1965 | Buehrig | 297/DIG. 2 |
| 3,270,393 | 9/1966 | Levenson | 297/DIG. 2 |
| 3,431,023 | 3/1969 | Anderson | 297/DIG. 2 |
| 3,669,496 | 6/1972 | Chisholm | 297/DIG. 2 |
| 3,822,425 | 7/1974 | Scales | 5/456 |

FOREIGN PATENT DOCUMENTS

| | | | |
|---|---|---|---|
| 0094281 | 11/1983 | European Pat. Off. | 297/DIG. 3 |
| 0004427 | 1/1982 | Japan | 297/DIG. 2 |

Primary Examiner—James T. McCall
Attorney, Agent, or Firm—Cushman, Darby & Cushman

[57] ABSTRACT

A seat for use in vehicles such as automobiles, airplanes or the like is disclosed in which each of panel-like frames is formed with integral, closed hollow chambers and expandable/contractible hollow chambers by means of blow molding so as to correspond to required projected portions and elasticity holding portions provided on the surface of the seat.

6 Claims, 5 Drawing Figures

VEHICLE SEAT

BACKGROUND OF THE INVENTION

1. Field of the Invention

The present invention relates a vehicle seat for use in automobiles or airplanes and more particularly to such seat employing resin frames formed by blow molding.

2. Description of the Prior Art

It is conventionally well known to form resin hollow members by means of blow molding and methods of forming automotive seat frames integrally by the blow molding have been also proposed.

In blow molding, generally, raw resin is extruded from a head in a tube-like manner such that it hangs down vertically, and in tube-like extrusion is trimmed as necessary and is closed at its ends to form a bag configuration, which is then accomodated into a mold composed of two divided parts. This mold surrounds the entire tube-like resin to be molded except a passage for air. The air passage can be provided by a nozzle which is extended down from the head. A nozzle mounted to the bottom of the mold or a nozzle provided at the side portion of the mold is used to blow air into the resin to be molded so that the resin being molded is expanded within the closed mold. After the expanded resin or molding is cured, the closed mold is opened to stop the pressurizing treatment, that is, the blow-in of air, so that the finished hollow resin member can be taken out of the mold.

When the resin hollow member is formed in this manner, both side walls ($1a$),($1b$) of the hollow portion ($2$) of the hollow member ($1$) have their respective thicknesses t1 and t2 which are respectively a half of the thickness 2t of the remaining portions of the hollow member as well as are equal to each other. This is because the two divided parts of the mold are formed to be equal to each other in their respective surface areas. Therefore, most of the moldings are symmetric with respect to plane.

On the other hand, as shown in FIG. 1(B), if the bisected mold is varied in surface area, then the thickness t1 of the plastic side wall ($1a$) which is attached to the mold part larger in surface area becomes thinner than the thickness t2 of the other side wall ($1b$), that is, the following relation is obtained; t1 < t2.

These phenomena have been considered as disadvantage in the prior art blow molding technique. However, the present invention makes positive use of such phenomena to form a hollow member, i.e., a resin seat frame.

SUMMARY OF THE INVENTION

Accordingly, it is the object of the invention to provide a vehicle seat which is provided on its surface with required projected portions and elasticity retaining portions and which can be manufactured in a simple manner.

To achieve this object, according to the invention, when a panel-like resin frame is formed, hollow portions are formed integrally in such frame on its seat surface side. This eliminates the need for provision of separate projected portions and elasticity retaining portions between a frame and a top layer as in the prior art seat.

The present invention is also characterized in that said hollow portions provided integral with said panel-like frame are so formed as to be expandable and contractible with their inner and outer walls being different from each other in thickness, and in that said hollow portions can be expanded by blowing air therein to form required projected portions having elasticity.

Therefore, according to the invention, there is eliminated the need for insertion of air bags between the seat frame and top layer as in the conventional seats, and thus a seat can be structured and manufactured in a simple manner.

DETAILED DESCRIPTION OF PREFERRED EMBODIMENTS OF THE PRESENT INVENTION

Figure 2:
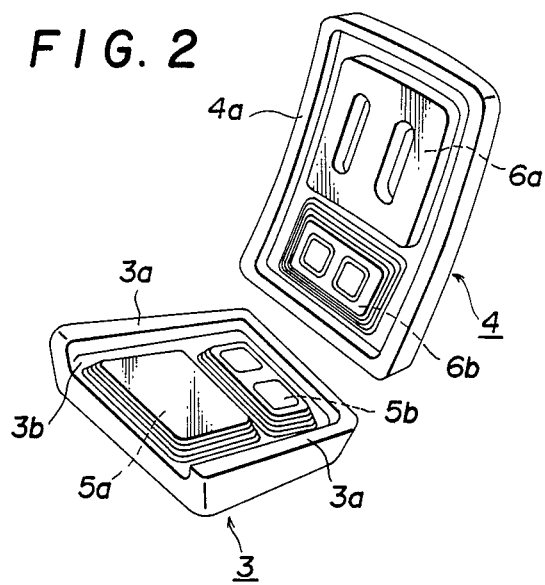
FIG. 2 is a perspective view of preferred embodiments of a cushion frame and a back frame used in the seat of the invention.

FIG. 2 illustrates a cushion frame (3) and a back frame (4) in a vehicle seat constructed by means of a blow molding technique according to the invention, i.e., it is a perspective view of the seat with its top layer member and pads being removed for clarity of illustration. The seat frame (3) and back frame (4) are constructed to have a substantially rectangular parallelepiped configuration, respectively. The cushion frame (3) is formed along its three peripheral sides except its front peripheral side with a U-shaped hollow edge portion ($3a$) and is also formed with hollow chambers ($5a$) and ($5b$) which are located in the front and rear half portions of its bottom section ($3b$), respectively. On the other hand, the back frame (4) is formed along its four peripheral sides with a hollow edge portion ($4a$) as well as hollow chambers ($6a$) and ($6b$) located in the upper and lower half portions of its rear section ($4b$) respectively.

Figure 1A:
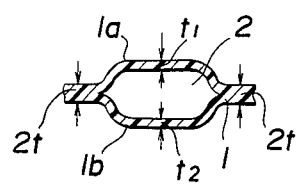
FIGS. 1A and 1B are explanatory views illustrating the principle of blow molding of hollow resin products according to the invention.
Figure 1B:
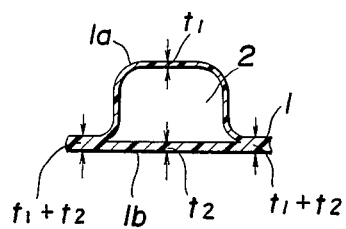
Figure 4:
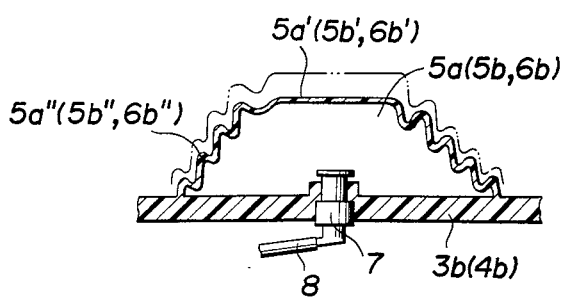
FIG. 4 is an enlarged section view of the hollow portions of the seat of the invention.
Figure 3:
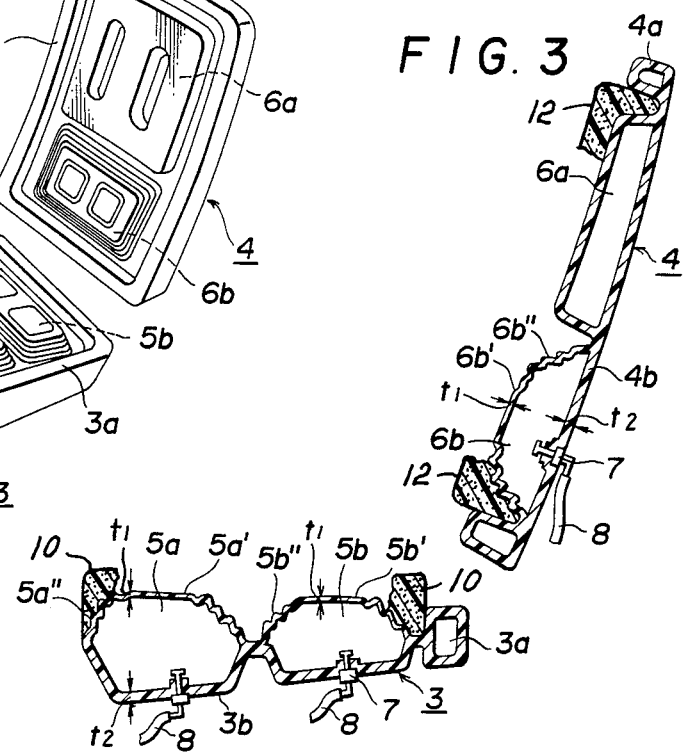
FIG. 3 is an enlarged, centrally longitudinal section view of FIG. 2.

Such front and rear hollow chambers ($5a$) and ($5b$) of the cushion frame (3) as well as lower hollow chamber ($6b$) of the back frame (4) are formed by utilizing the phenomena described before with reference to FIG. 1B. Specifically, as shown in FIG. 3, the hollow chambers ($5a$),($5b$) and ($6b$) are formed respectively to have internal walls ($5a'$),($5b'$) and ($6b'$) of a thickness t1 that is smaller than a thickness t2 of its outer walls, i.e., the bottom section ($3b$) and back section ($4b$). Also, these hollow chambers ($5a$),($5b$) and ($6b$) are provided on their peripheral surfaces with pleated bellows-like portions ($5a''$),($5b''$) and ($6b''$), extending parallel to the bottom and rear sections ($3b$),($4b$), respectively, so that the hollow chambers ($5a$),($5b$) and ($6b$) can be expanded and contracted as desired. Moreover, these hollow chambers ($5a$),($5b$) and ($6b$) are respectively provided with gas filling nozzles (7) on the side of the bottom and back sections ($3b$) and ($4b$), which nozzles (7) are in turn connected with the respective air feed pipes (8).

When gas is charged through the gas filling nozzles (7), the hollow chambers ($5a$),($5b$) and ($6b$) thus formed in the seat cushion frame (3) and back frame (4) are expanded and thus their respective inner walls ($5a'$),($5b'$) and ($6b'$) are inflated out to push out pads 10,12 provided on their respective surface sides, so that the seat cushion and seat back are formed on their respective surfaces with required projected portions as well as are provided with desired elasticity.

For example, with respect to the cushion frame (3), the expansion of the front hollow chamber (5a) can be adjusted to change the height of the front edge of the seat cushion, and it is also possible to vary the feeling or hardness of a portion to be seated by adjusting the expansion of the rear hollow chamber (5b). On the other hand, by adjusting the expansion of the lower hollow chamber (6b) in the back frame (4), the projection height of the lumbar support portion of the seat back can be altered. Also, the upper hollow chamber (6a) of this back frame (4) can be constructed such that it can be expanded and contracted similarly to the lower hollow chamber (6b). In that case, it could be possible to change the feeling of the back rest portion of the seat back optionally according to the preference of an occupant of the seat.

According to the invention, the cushion frame (3) and back frame (4) can be provided with other hollow chambers than the above mentioned hollow chambers, that is, both frames can be formed with hollow chambers in their other portions. For example, the seat cushion and seat back may be formed in their respective both ends with hollow chambers that can be expanded and contracted and thus both of them can be provided in their respective both ends with projection portions as required so as to improve its support performance for the occupant.

As can be understood from the foregoing description, in order to provide desired projection portions and elasticity holding portions on the surface portion of the seat, the seat of the invention is constructed in such a manner that its seat frame is formed with integral hollow chambers which are expandable and gas is charged directly into the chambers so as to expand the chambers or the seat, without employing the prior art structure in which separate air bags formed of rubber or the like are interposed between a top layer member and pads or between the pads and a seat frame for injection of air. The present invention, therefore, is advantageous over the prior art seat using air bags in that it can be constructed more simply, that it is possible to simplify its manufacturing steps since its hollow chambers are formed integrally with the seat frame when the latter is formed by blow molding, and that its cost is reduced.

What is claimed is:

1. A vehicle seat frame of the type for supporting a cushion pad thereon comprising a bottom section and adjustment means integrally formed with said bottom section to permit for selective displacement adjustment of a portion of the pad relative the bottom section of said seat frame, said adjustment means including a top wall and side walls integrally formed with one another and with said bottom section of the seat frame and together defining an interior closed hollow chamber, said side walls including means defining plural pleated portions for permitting expansion and contraction of said chamber in response to introduction and exhaustion of a pressurized fluid into and from said chamber, respectively, to displace said top wall relative said bottom section which, in turn, is capable of displacing the pad portion to selectively adjust the same.

2. A vehicle seat frame as in claim 1 wherein the top and side walls are each of a lesser cross-sectional dimension than said bottom section.

3. A vehicle seat frame as in claim 1 further comprising nozzle means in fluid communication with said hollow chamber to permit said pressurized fluid to be introduced thereinto and exhausted therefrom.

4. A vehicle seat comprising a pad, a seat frame having a bottom section to support the pad and pad displacement means to selectively adjust the displacement of at least one localized portion of said pad relative said seat frame, said pad displacement means including at least one closed hollow chamber integrally formed with said bottom section of said seat frame and subjacently disposed relative to said localized portion of said pad, said integrally formed hollow chamber having a top wall and integral side walls, said side walls including bellows-defining means establishing plural pleated portions for permitting expansion and contraction of said hollow chamber in response to introduction and exhaustion of a pressurized fluid into and from said hollow chamber, respectively, to displace said top wall and thus said localized pad portion relative said bottom section of said seat frame whereby said localized pad portion is adjusted.

5. A vehicle seat as in claim 4 wherein the top and side walls are each of a lesser dimension than said bottom section of said seat frame.

6. A vehicle seat as in claim 4 further comprising nozzle means in fluid communication with said chamber to permit said pressurized fluid to be introduced thereinto and exhausted therefrom.

* * * * *